United States Patent [19]

Teller

[11] 4,271,134
[45] Jun. 2, 1981

[54] TREATMENT OF EFFLUENT GASES FROM THE MANUFACTURE OF FERTILIZER

[75] Inventor: Aaron J. Teller, Westboro, Mass.

[73] Assignee: Teller Environmental Systems, Inc., Worcester, Mass.

[21] Appl. No.: 160,441

[22] Filed: Jun. 18, 1980

Related U.S. Application Data

[63] Continuation of Ser. No. 18,485, Mar. 8, 1979, abandoned.

[51] Int. Cl.³ .............................................. B01D 53/34
[52] U.S. Cl. ................................ 423/238; 423/215.5; 423/305; 423/310; 423/313; 423/240; 71/34; 55/68; 55/71; 55/73
[58] Field of Search .............. 423/238, 215.5, 305, 423/310, 313, 240, 241; 71/34; 55/68, 71, 73, 70

[56] References Cited

U.S. PATENT DOCUMENTS

| | | | |
|---|---|---|---|
| 1,716,415 | 6/1929 | Buchanan | 423/310 |
| 2,040,563 | 5/1936 | Phillips | 423/238 X |
| 3,579,322 | 5/1971 | Higgins | 423/305 |
| 3,672,828 | 6/1972 | Henderson | 423/305 X |
| 3,721,066 | 3/1973 | Teller | 55/73 |
| 3,764,654 | 10/1973 | Shah | 423/215.5 X |
| 3,773,633 | 11/1973 | Teller | 423/240 X |
| 3,808,774 | 5/1974 | Teller | 55/68 |
| 3,859,417 | 1/1975 | Teller | 423/240 X |
| 3,969,482 | 7/1976 | Teller | 423/215.5 X |
| 3,995,005 | 11/1976 | Teller | 423/215.5 X |
| 4,011,301 | 3/1977 | Young | 423/313 |
| 4,169,714 | 10/1976 | Calvert | 55/6 X |

Primary Examiner—Earl C. Thomas
Attorney, Agent, or Firm—Thompson, Birch, Gauthier & Samuels

[57] ABSTRACT

Process and apparatus are described for an improved treatment of gases effluent from an ammonia phosphoric acid reactor in the manufacture of fertilizers. Ammonia is scrubbed from the gases with aqueous acid, preferably concentrated phosphoric acid, and particulates are captured and removed by contact with solid target particulates, preferably alkaline nephaline syenite. Pond water scrubbing is reduced or eliminated with improved costs and recoveries, secondary pollution is minimized, and land is conserved.

8 Claims, 1 Drawing Figure

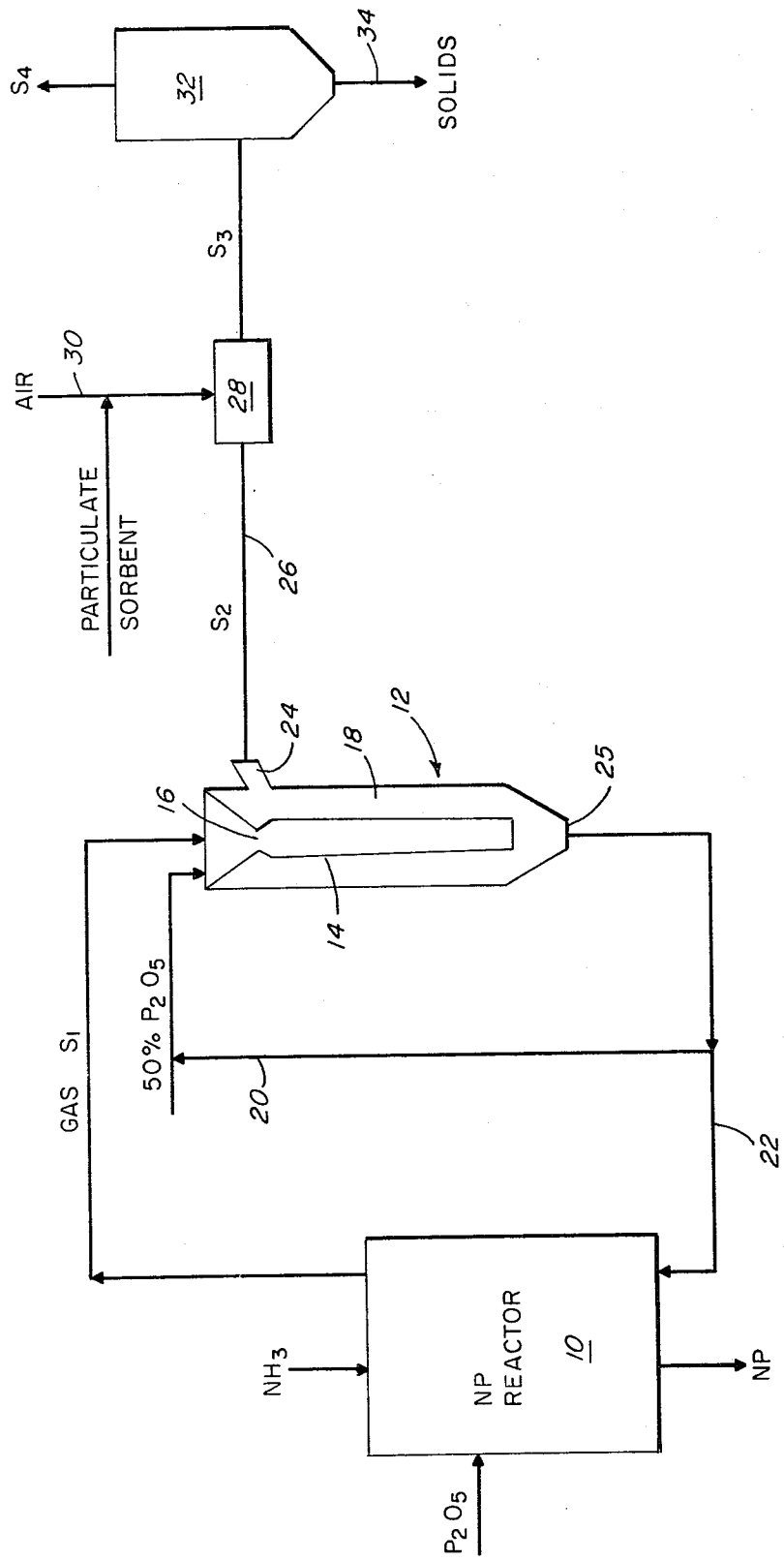

TREATMENT OF EFFLUENT GASES FROM THE MANUFACTURE OF FERTILIZER

This is a continuation of application Ser. No. 018,485, filed Mar. 8, 1979, now abandoned.

BACKGROUND OF THE INVENTION

This invention relates to an improved process for the reduction of air and water pollution resulting from the manufacture of fertilizer.

In the manufacture of fertilizer, aqueous phosphoric acids or acid salts thereof are produced and reacted with ammonia to produce various nitrogen grades of fertilizer such as mono ammonium or diammonium phosphate. In one common process, phosphate rock containing fluorapatite $[Ca_5F(PO_4)_3]$ is ground and reacted with aqueous sulfuric acid. After filtering to separate gypsum and other insoluble by-products, the crude aqueous phosphoric acid is concentrated by evaporation. Substantial quantities of fluoride gases are produced which are scrubbed from the effluent gases and substantial cooling is required. Large ponds are employed as repositories for insoluble by-products and as a source of recycle water for washing the filters and for scrubbing and cooling. Such ponds are costly to build and operate and are of increasing concern as a source of water and air pollution.

When aqueous phosphoric acid is reacted with ammonia, the resulting effluent gases contain substantial quantities of ammonia, fluoride, and other particulates. Conventionally, these gases have been washed with aqueous phosphoric acid to recover ammonia and a portion of the particulates, and thereafter scrubbed with pond water in a packed enclosure before exhausting to atmosphere. Washing with phosphoric acid releases fluoride gases such as HF and $SiF_4$ and copious quantities of pond water are subsequently required for cooling to more effectively remove the fluoride gases and submicron particulates.

It has been estimated that the cooling ponds employed cost per acre between $20,000 and $30,000 to build and between $2,000–$5,000 per year to maintain. Expensive piping is also required and all overflows must be carefully neutralized. A typical integrated site will require a cooling pond area of one hundred acres or more, about one-half of which may be required to scrub the effluent gases from the ammonia-phosphoric acid reactor.

The phosphoric acid used to wash the gases has been restricted to aqueous concentrations between about 20–40% $P_2O_5$ by weight because, at higher concentrations, increasing quantities of submicron fluoride particulates such as $NH_4F$, $NH_4F \cdot HF$ and $(NH_4)_2SiF_6$ are produced which are very difficult to remove from the gases. As a result, substantial water is present in the ammoniated acid when it is returned to the process for drying and conversion to product. About 85–99% of the ammonia in the effluent gases has been thus recovered.

Since pond water typically is highly acidic, scrubbing with phosphoric acid is sometimes omitted and pond water is employed throughout.

SUMMARY OF THE INVENTION

It is the principal object of the present invention to provide an improved process for treating the effluent gases from an ammonium fertilizer reactor which is both more effective and more economic. Further objects include the elimination of the need for cooling water with its attendant cooling pond, to improve the rate of recovery of ammonia, to decrease the water load on the dryer, and to provide the separated wastes in convenient solid form which can be used or readily disposed as described hereinafter.

According to the present invention the improved process comprises washing the effluent gas stream from the ammonia reactor, with or without inclusion of effluent gases from the product dryers, with concentrated phosphoric acid having a $P_2O_5$ content by weight between about 45–55%, and most preferably about 50%, followed thereafter by treatment of the gases by contacting them with dry, finely divided, target particles of sorbent material, and separating the particulate material from the gas. By using a dry process to capture particulates and acid gases, the need for cooling water is eliminated, and by using concentrated phosphoric acid as the scrubbing liquid, moisture saturation of the gases is avoided which may interfere with the subsequent dry sorption process.

A number of suitable dry processes are known. For example, the use of target particles of nepheline syenite, phonolite, calcium hydroxide or the like is disclosed in U.S. Pat. Nos. 3,721,006; 2,773,633; 3,808,774; 3,859,417; 3,995,005; and 3,969,482 and the disclosures thereof are incorporated herein by reference. As disclosed therein, the target particles which contact the gas may be used as a precoating on baghouse filters, may be introduced into the gas stream as a dry powder, or may be entrained in a secondary air or other gas stream. Most preferably however, they are mixed in a secondary air or other gas stream and injected into the primary effluent gas stream with a relative velocity sufficient to capture the contaminating particulates by impact as disclosed in my copending U.S. Application Ser. No. 892,881, entitled DRY IMPACT CAPTURE OF AEROSOL PARTICULATES, the disclosure of which is incorporated herein by reference. These target particles preferably have an average particle size between about 3 and 50 microns, more preferably 10–20 microns, and are preferably alkaline reacting materials to remove residual contaminating acid gases. Nepheline syenite is most preferred. The target particles and contaminating particulates may be separated from the gas in any convenient way, for example by baghouse filters, a cyclone separator, or the like.

While the use of concentrated phosphoric acid to wash ammonia from the gases as described above is preferred, conventional phosphoric acid of lower concentration or acidic pond water may also be used, but with lowered efficiency. Some heating of the gases may be necessary to maintain a dry bulb temperature at least about 20° F. above dew point during particulate separation.

DESCRIPTION OF DRAWING AND PREFERRED EMBODIMENT

The accompanying drawing is a schematic illustration of a preferred embodiment of the present invention.

Referring to the drawing, aqueous phosphoric acid (shown as $P_2O_5$) is reacted with ammonia in NP reactor 10 to obtain ammonium phosphate salts and the NP product recovered for further processing, for example drying and granulating. The effluent gases S1 from the reactor 10 containing ammonia, fluorides and solid particulates are passed into the venturi contactor 12. Contactor 12 comprises an inner chamber 14 open at each end with a venturi 16 in its upper portion, and an outer concentric chamber 18 having a gas outlet 24 and fluid outlet 25. Concentrated phosphoric acid ($P_2O_5$) is sprayed into the gas S1 as it enters the venturi 16. The acid reacts with and captures the majority of the ammonia entrained in gas S1 and the resulting liquid is drained from the bottom of contactor 12 through outlet 25 with a portion recirculated as shown at 20 and another portion or slipstream returned to reactor 10 as shown at 22. Typically, a major portion of the phosphoric acid product is recirculated. The contact of the ammonia laden gases with the concentrated phosphoric acid results not only in the absorption of ammonia but also the formation of ammonium fluoride, ammonium bifluoride particulates and some HF and $SiF_4$.

Effluent gas S1 is passed downwardly through vertical chamber 14, outwardly through its open lower end into annular chamber 18 where it passes upwardly to the gas outlet 24, and exits as washed gas S2 into a conduit 26. In chamber 28, which is preferably of one of the constructions shown in copending Application Ser. No. 892,881, the gas S2 is mixed with a secondary air stream 30 into which particulate sorbant material has been dispersed. As shown in the copending application, the secondary stream 30 is preferably injected from a plurality of radial positions into the mixing chamber 28, which may comprise a portion of the duct 26, with a relative velocity sufficient for the target particles to capture by impact the contaminating particulates in stream S2. The combined gas stream S3 then passes to separating apparatus 32 which may comprise a cyclone or other apparatus of known construction, but which is preferably a baghouse.

The cleaned gas stream S4 is not saturated with moisture and is exhausted from the separator 32 with essentially no visible appearance. Except for the scrubbing materials, no heat is added to or removed from the gas. The solids separated within separator 32 are removed as a free flowing powder at 34. They include the target particulates, preferably nepheline syenite, and recovered contaminating particulates and acid gases, principally as ammonium fluoride [$NH_4F$], ammonium bifluoride [$NH_4F.HF$], and ammonium fluosilicate [$(NH_4)_2SiF_6$]. The solids collected may be mixed with the fertilizer product for sale or the ammonium fluoride salts may be dissolved in a concentrated form and a portion of the insoluble nepheline syenite separated and recycled. The ammonium fluoride salts may also be sold as a fluxing agent in the manufacture of nonferrous metals or may be added to impure phosphoric acid as a clarifying agent.

The mixed gas stream S3 contains sufficient moisture for activation of nepheline syenite or other target particulate material as disclosed in the above-referenced patents but is sufficiently low in relative humidity to avoid plugging separator 32. Typically, the gas stream has a dry bulb temperature above 125° F. and from 40°–80° F. higher than its dew point temperature. A temperature difference of at least about 20° F. should be maintained.

If desired, the gases effluent from the treating apparatus after NP reactor 10, for example the dryer or granulator, can be similarly treated together with or separately from the effluent gases from the NP reactor.

The preferred example of the present invention is given in Example 1.

EXAMPLE 1

60,000 ACFM of effluent gas S1 having a dry bulb-/dew point temperature of 155°/150° F. and containing 2 pounds per hour fluoride, 1,000 pounds per hour of $NH_3$, and 500 pounds per hour of contaminating particulates was passed into verturi 16 of contactor 12. 900 gallons per minute of phosphoric acid at 50% $P_2O_5$ were recirculated through chamber 14 of contactor 12, and a slipstream of the recirculating liquid was returned via conduit 20 to reactor 10. 55,000 ACFM of scrubbed gas S2 were recovered from contactor 12 having a dry bulb/wet bulb temperature of 184°/127° F. and having a fluoride content of 2 pounds per hour, $NH_3$ content of 10 pounds per hour and a contaminating particulate content of 700 pounds per hour. A secondary air stream of 3,000 ACFM at 90° F. (dry bulb), having 60 pounds per hour of nepheline syenite with an average particle size between 10 and 20 microns dispersed therein, was injected into the stream S2 within chamber 28. The mixed gas stream S3 exited from chamber 28 at 58,000 ACFM and with a temperature, dry bulb/wet bulb, of 178/125 and was passed through a baghouse 32. Effluent gas stream S4 was discharged at the rate of 58,000 ACFM at a dry bulb/wet bulb temperature of 178/125 and with an ammonium gas content of 3 pounds per hour, fluoride gas content of 0.5 pounds per hour and a particulate content of about 14 pounds per hour. About 99% of the $NH_3$ in the effluent gas was recovered as product.

A comparison between the prior art process and the present process is given in Table 1 below for a plant having a production rate of dried NP product of about 140 tons per hour.

TABLE 1

|  | Prior Art 35% $P_2O_5$ | Present Invention 50% $P_2O_5$ |
| --- | --- | --- |
| Pond Water, GPM | 3000 | 0 |
| Ammonium Gas Effluent, lb/hr | 35 | 3 |
| Fluoride Gas Effluent, lb/hr | 4 | 0.5 |
| Fluoride to Pond, lb/hr | 20 | 0 |
| Ammonia to Pond, lb/hr | 100 | 0 |
| Particulate Effluent, lb/hr | 25 | 14 |

Any suitable liquid contacting apparatus 12 may be used. A concentric venturi of known construction as illustrated in the drawing is preferred.

Concentrated phosphoric acid, about 45–55% $P_2O_5$ by weight, is preferred and can be used in the process herein disclosed. Improved ammonia recovery is obtained, less drying is required to recover product therefrom, and subsequent heating of the gases is usually unnecessary. However, if desired, lower concentrations of $P_2O_5$, or acidic pond water may be used. Subsequent dry scrubbing of particulates as described will still eliminate most of the pond water now used with its attendant cost and limitations. With such acids, some heating of the gases may be necessary to maintain dry bulb gas temperature about 20° F. or more above dew point during particulate separation. Such heating, where required, may be provided at any suitable location. Such heating may be applied, for example, to one or more of gas streams $S_1$, $S_2$, $S_3$ or the secondary stream 30 as shown in the drawing.

As illustrated and described above, the present invention is more economical than presently used technology, minimizes secondary pollution, conserves land, and can produce separated solids as a saleable product.

It should be understood that the foregoing description is for the purpose of illustration and that the invention includes all equivalents and modifications within the scope of the appended claims.

What is claimed is:

1. A process for treating ammonia containing effluent gases from a nitrogen phosphate fertilizer reactor which comprises:

washing the effluent gases with concentrated phosphoric acid containing between about 34–55 weight percent of $P_2O_5$ to remove ammonia;

forming a product gas containing acid gases and particulates including $NH_4F$ and $NH_4F.HF$;

contacting subsequently the product gas with finely divided alkaline target particles of solid sorbent material to capture contaminating particulates in the acid gases;

separating the particulates and target particles from the product gas; and, maintaining the effluent gases and the product gas during separation at a dry bulb temperature of at least about 20° F. above dew point.

2. The process of claim 1 wherein said sorbent material comprises nepheline syenite, phenolite, calcium hydroxide, lime, limestone or mixtures thereof.

3. The process of claim 1 wherein said target particles of sorbent material are alkaline to remove contaminating acids from the gas.

4. The process of claim 1 wherein the target particles are dispersed in a secondary gas stream which is introduced with a sufficient relative velocity into the primary effluent gas stream whereby the contaminating particulates impact with and are captured by the target particles.

5. The process of claim 4 wherein the combined primary and secondary gas streams have a dry bulb temperature between them at least about 20° F. higher than their dew point temperature.

6. The process of claim 5 wherein a portion of said contaminating particulates are smaller than one micron and said target particulates have an average size between about 3 and 50 microns.

7. The process of claim 1 wherein phosphoric acid contacts the effluent gases in a venturi.

8. The process of claim 7 wherein said venturi is a concentric venturi within which the gas flows downwardly through an inner chamber having a venturi section and upwardly to an outlet through an outer concentric chamber, the acid being separated and recovered from the bottom of one of said chambers.

* * * * *

UNITED STATES PATENT AND TRADEMARK OFFICE
CERTIFICATE OF CORRECTION

PATENT NO. : 4,271,134
DATED : June 2, 1981
INVENTOR(S) : Aaron J. Teller

It is certified that error appears in the above–identified patent and that said Letters Patent are hereby corrected as shown below:

Claim 1, line 5: cancel "34" and substitute therefor --45--.

Signed and Sealed this

Twentieth Day of April 1982

[SEAL]

Attest:

GERALD J. MOSSINGHOFF

Attesting Officer     Commissioner of Patents and Trademarks